Figure 1:
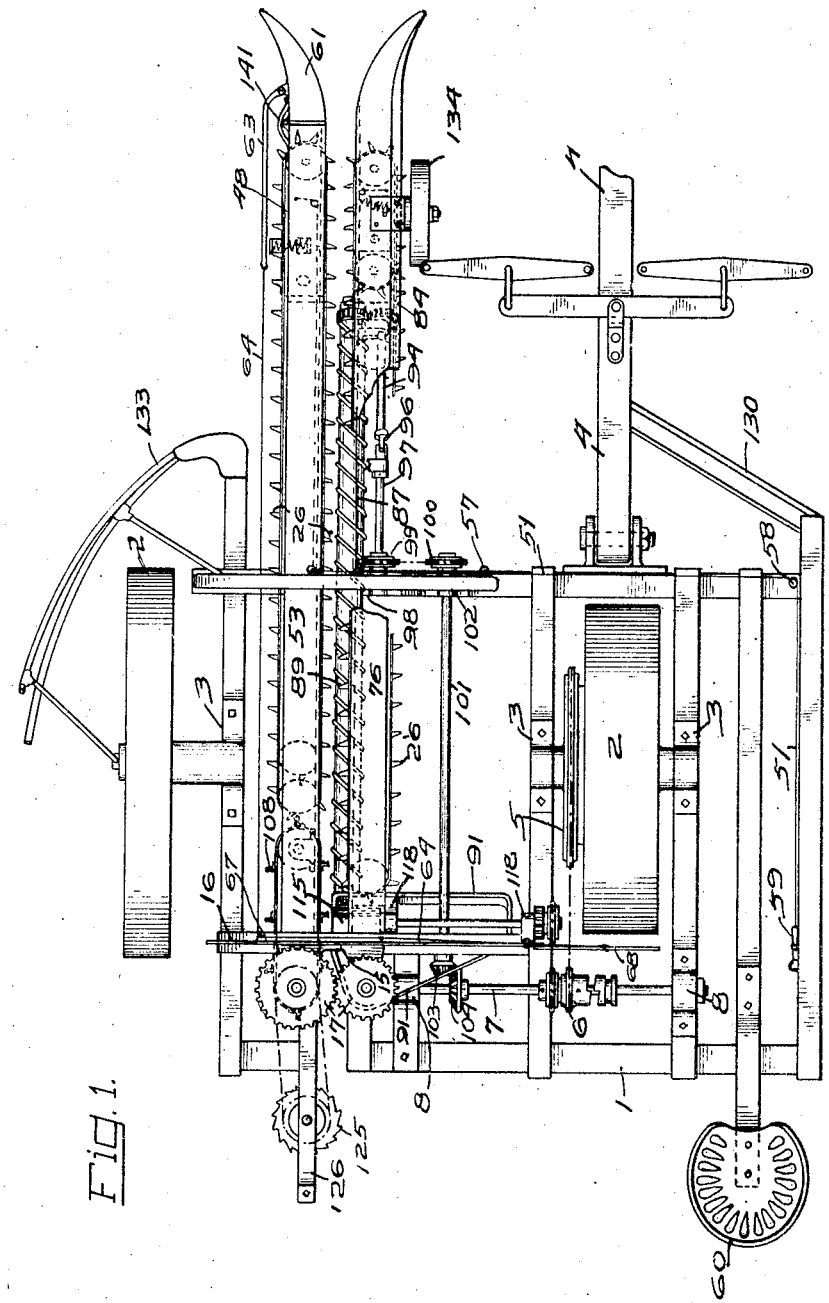

H. J. HAHN.
CORN HARVESTER.
APPLICATION FILED JAN. 19, 1917.

1,238,402.

Patented Aug. 28, 1917.
4 SHEETS—SHEET 1.

INVENTOR
Herman J. Hahn
by
Owen, Owen & Crampton

H. J. HAHN.
CORN HARVESTER.
APPLICATION FILED JAN. 19, 1917.
1,238,402.
Patented Aug. 28, 1917.
4 SHEETS—SHEET 2.
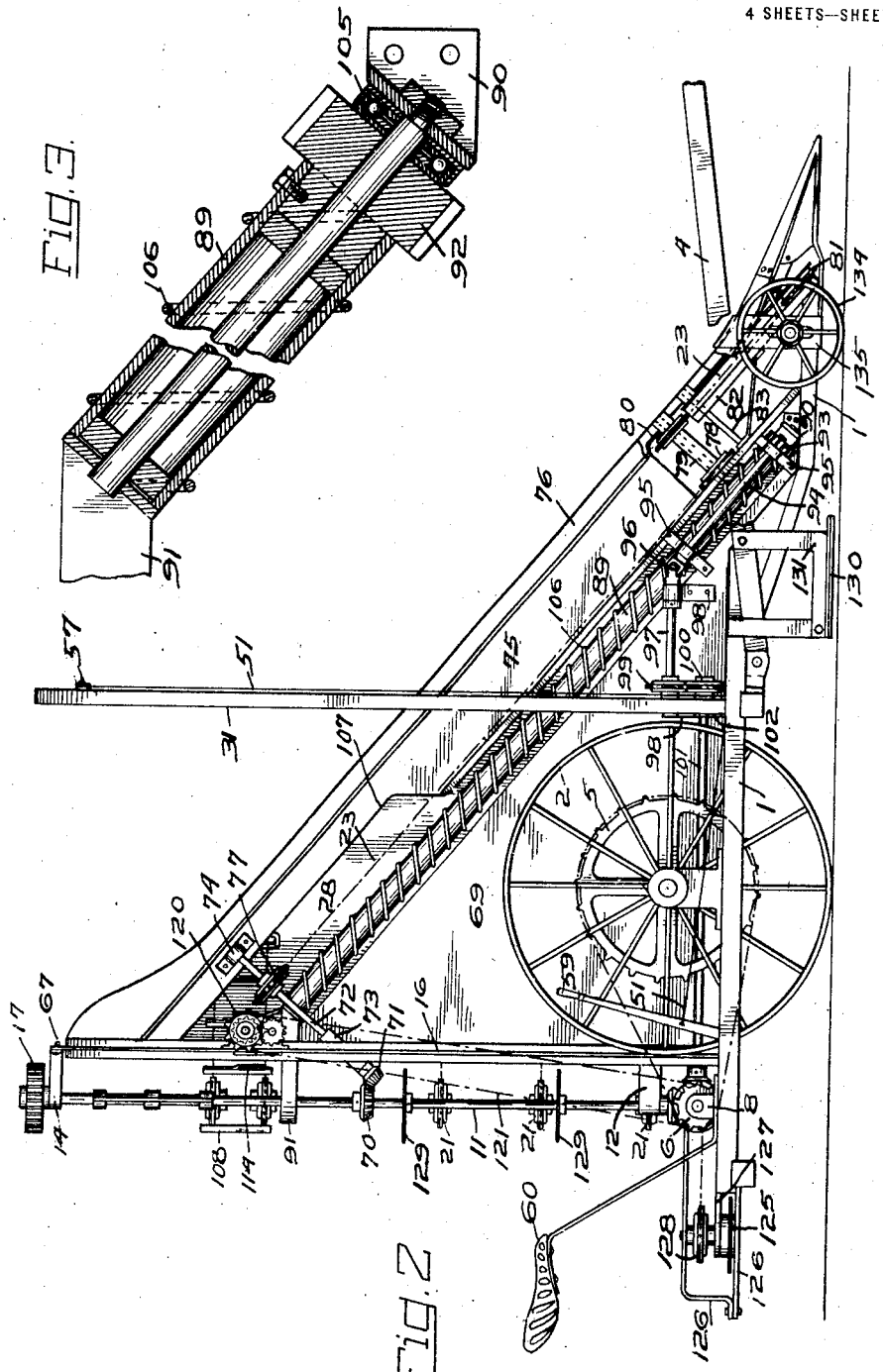
INVENTOR
Herman J. Hahn
by
Owen, Owen, Crampt

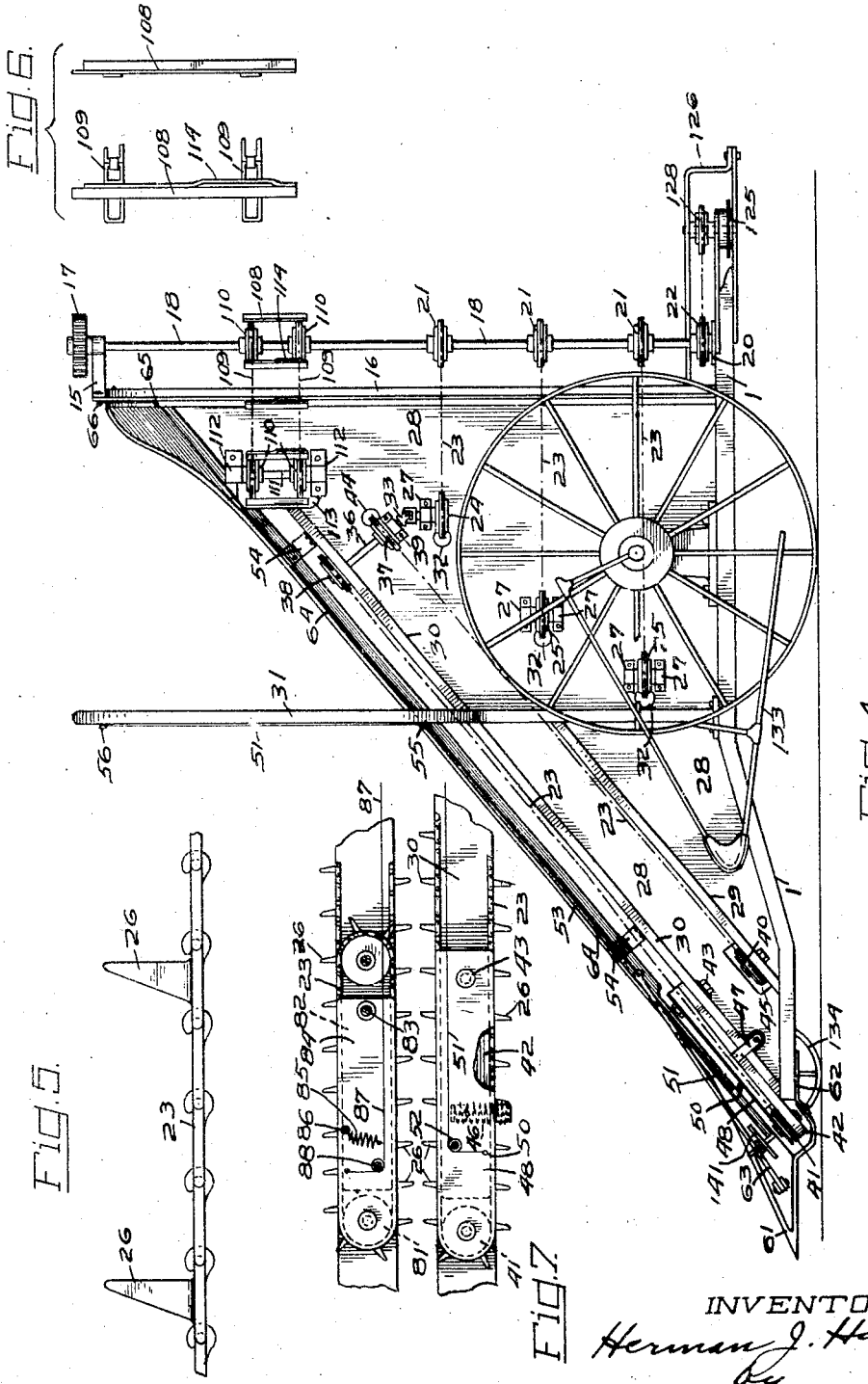

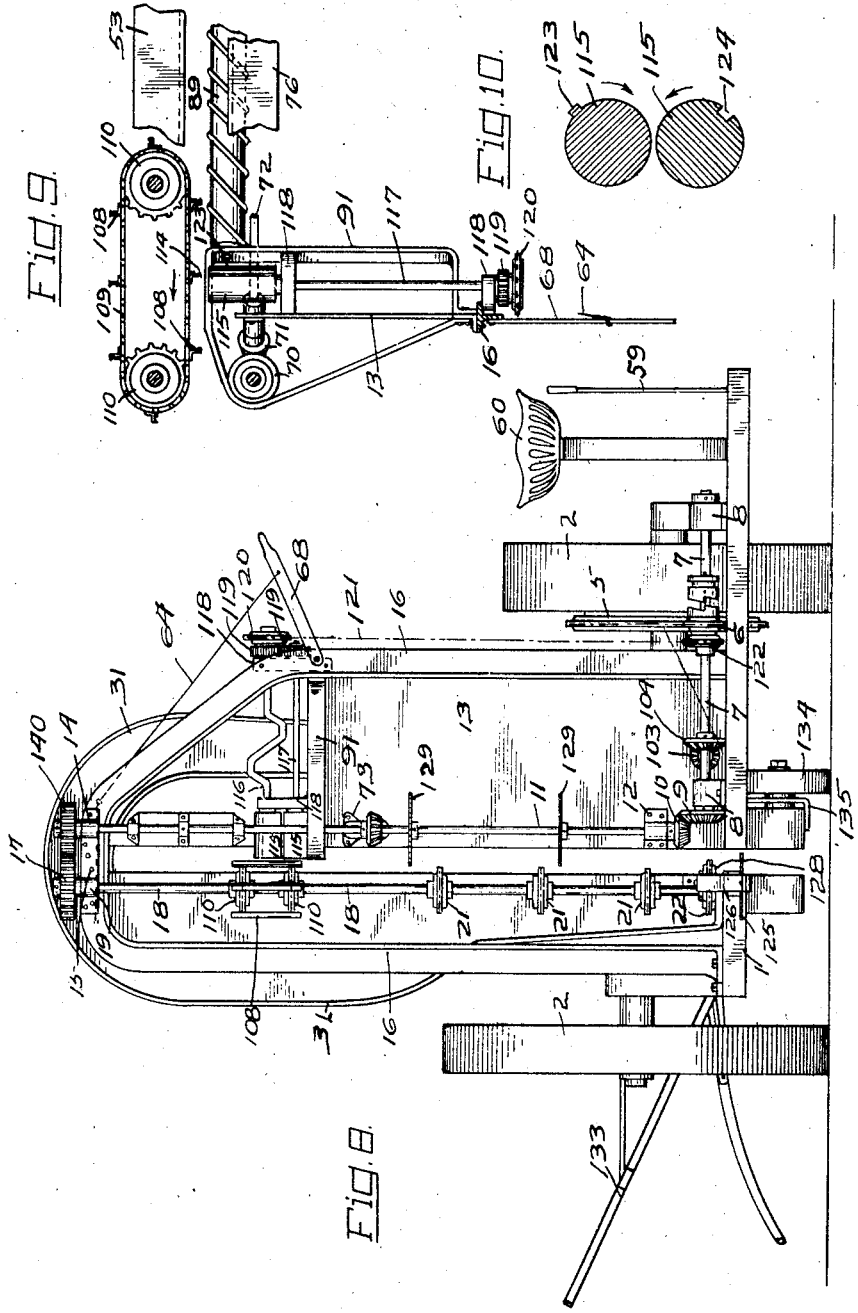

UNITED STATES PATENT OFFICE.

HERMAN J. HAHN, OF NAPOLEON, OHIO.

CORN-HARVESTER.

1,238,402.   Specification of Letters Patent.   Patented Aug. 28, 1917.

Application filed January 19, 1917. Serial No. 143,278.

*To all whom it may concern:*

Be it known that I, HERMAN J. HAHN, a citizen of the United States, and a resident of Napoleon, in the county of Henry and State of Ohio, have invented a certain new and useful Corn-Harvester; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to corn harvesters. It particularly relates to means for removing the ears of corn from stalks while the stalks remain standing in the field.

It provides means for holding the stalks in a vertical position while the harvester is moved along the rows of stalks and the ears are being removed from the stalks. It also provides means for picking the stalks up that are bent down, and means is also provided for raising them so that they will be placed in an upright position. It further provides means for cleaning the stalks into parts or sections to be subsequently bound by means of a binder, or plowed under, if desired. It also provides a means for removing the corn from the stalks when the corn is pulled up by the operation of the machine. It also provides other features which will appear in the drawings forming a part hereof and in the description of the construction shown in the drawings.

The invention may be contained in many forms of constructions usable for different purposes, all of which come within the purview of my claims hereinafter appended. To show the practicability of my invention I have selected one of such constructions as an example and shall describe it hereinafter.

Figure 1 of the drawings is a top view of the corn harvester. Fig. 2 is one side view of the harvester illustrated in Fig. 1. Fig. 3 is a sectional view partly broken showing the barrel for removing the stalks and for drawing the leaves of the stalks in an upright position and along the stalks. Fig. 4 is another side view of the harvester. Fig. 5 illustrates the chain for holding the stalks in position while the harvester is moved relative to the stalks. Fig. 6 illustrates edge and side view of bars for forcing the stalks that are pulled from the hills toward rollers for removing the corn from such stalks. Fig. 7 illustrates a top view of the means for picking up the stalks that have fallen down. Fig. 8 is a rear view of the harvester. Fig. 9 is a view of the bars shown in Fig. 6 and the rollers for removing the corn from the stalks which are not removed by the barrel illustrated in Fig. 3 and from stalks which are pulled up in the operation of the machine. Fig. 10 is a sectional view of the rollers for pinching the corn from the stalks which are not removed by the barrel illustrated in Fig. 3, or which are on stalks which have been pulled up by the machine.

1, Fig. 1, is a frame of the harvester. It is supported on wheels 2 which are secured in position with reference to the frame by means of suitable bearings 3. The machine is guided by a tongue 4 and may be pulled by horses or by other sources of power. The harvester may be operated by an engine which may be supported upon the frame 1 or it may be operated by the sprocket or chain wheel 5 which is secured to the wheel 2, which carries the major portion of the weight of the harvester. The wheel 5 is connected by a suitable sprocket chain or gear chain to a wheel 6, which is keyed to a shaft 7 located in the rear part of the frame 1. The shaft 7 extends transverse to the frame and is connected by gear wheels or sprocket chains with various parts of the mechanism.

As shown in Fig. 8, the shaft 7 is supported in bearings 8 secured on the frame 1. It is provided with a bevel gear wheel 9 which operates on a bevel gear wheel 10. The bevel gear wheel 10 is keyed to a shaft 11 which is located in a vertical position and is supported in a bearing 12 located on a rear wall 13. It is also supported in a bearing 14 formed in a bracket 15 secured to an inverted U-member 16 which is bolted to the frame 1. The upper end of the shaft 11 is provided with a cog wheel 140 which operates on a cog wheel 17. The cog wheel 17 is keyed on a shaft 18 that is located in parallel relation to the shaft 11. The shaft 18 is supported in a bearing 19 which is also formed in the bracket 15. The shaft 18 is also supported by an end thrust bearing formed by the plate 20 located on the frame 1, Fig. 4. A plurality of sprocket wheels 21 and 22 is keyed to the shaft 18. The sprocket wheels 21 are connected by means of sprocket chains 23 to sprocket wheels 24 and 25. The sprocket chains 23 are provided with lugs or fingers 26. The sprocket wheels 24 and 25 are supported in bearings 27 which are secured to a vertical triangular wall 28. The vertical wall is supported on the frame 1 by means of strips 29 and 30 which are secured to the frame 1 and to a vertical member 31 which is also bolted to the frame 1. The sprocket chains 23 pass through openings 32 formed in the wall 28. The fingers 26 necessarily extend outwardly from the sprocket chains 23 and are carried by the rotation of the shaft 18 along the wall 28. On the side on which the wheels 24 and 25 are located they are carried forward, and on the opposite side of the wall they are carried rearward. The wheel 24 is connected by means of a universal joint 33 to a shaft 36 which is also provided with sprocket wheels 37 and 38. The shaft 36 is supported in bearing 39 and in a bearing formed in the strip 30. The wheels 37 and 38 are also connected by sprocket chains 23 having fingers 26 to sprocket wheels 40 and 41 which are supported on bolts or shafts, one of which is secured to the strip 29 and the other to a pivoted arm 42 which is connected by means of the bolt 43 to the strip 30. The fingers 26 of the sprocket chain 23 connecting the wheels 37 and 40 and the wheels 38 and 41 likewise move forwardly on the side of the wall 28 on which the wheels are located and rearwardly on the opposite side of the wall. An opening 44 is provided in the vicinity of the wheel 37 for permitting the fingers 26 to pass from one side of the wall to the other. Likewise an opening 45 is provided through the wall and is located in the vicinity of the wheel 40. The chain 23, which connects the wheels 38 and 41, is located above the upper edge of the wall 28.

The arm 42, which carries the wheel 41, may be operated to move the lower end of the chain 23 and the fingers 26 transverse the wall 28. The wheel 41 is located beneath the lower corner of the wall 28 and very close to the ground, so as to pick up the corn that is bent down by the wind or from any other cause and lift it into position so that it may be operated upon by the corn harvester. The arm 42 which carries the wheel 41 is swung to the side of the wall opposite that to which the wheels 40, 24 and 25 are located upon to cause the fingers 26 to not only engage the corn that is thus windblown, but also to hold the corn thus engaged. The corn stalks are merely engaged by the fingers and easily drop off the fingers unless the wheel 41, together with the lower end of the chain belt 23, is shifted so as to engage the corn and hold it. The arm 42 is held in its normal position by means of a spring 46 which is located intermediate the wall 28 and an arm 47. The pivoted member is rabbeted in its upper edge and is covered with a strip of sheet metal 48. Thus a channel is formed intermediate the sheet metal 48 and the arm 42 in which the chain 23 moves. A cord or wire is secured to the pin 50 which extends through the sheet metal 48 and is secured in the arm 42. The wire 51 passes over a pulley 52 which is secured to a top board 53. The board 53 is separated from the strip 30 a short distance and is held in position by means of brackets 54 which are secured to the board and to the strip 30. The wire 51 extends to the top of the frame 31 and passes over the pins 55, 56 and 57, thence over a pin 58 (Fig. 1) to the lever 59 located beside the seat 60 and in position where it may be operated by the driver to swing the wheel 41 transverse the wall 28 to cause the fingers 26 to engage with the corn. The spring 46 operates to cause the return of the arm 42 to its normal position when it is released by a movement of the lever 59.

The lower end of the wall 28 is provided with a nose 61 (Fig. 4) formed of sheet metal. It is pivotally supported on the bracket 62 and to the board 53. The nose 61 is connected to a rod 63 which is connected to a wire 64 that extends to the top of the frame 16 and passes over pins 65, 66 and 67 to a lever 68 which is pivotally supported on the frame 16 in the vicinity of the seat 60. When the wire 64 is pulled by the operation of the lever 68 the nose 61 is swung on its pivot on its support so as to engage the stalks of the corn. This is particularly useful when the harvester has been turned and is about to be lined up with the hills of corn that is to be harvested. The nose 61 directs the corn stalks to the face of the wall 28 and so as to be engaged by the fingers 26 of the chains 23. The nose 61 is returned by the spring 141.

A second wall 69 (Fig. 2) is located in parallel relation with the wall 28. It is likewise supported on the frame 1 and by a rear wall 13 which is also secured to the frame 1 and to the U-member 16 shown in Fig. 8. The shaft 11 is provided with a bevel gear 70 which operates on a bevel gear 71. The bevel gear 71 is keyed to a shaft 72. The shaft has a bearing 73 secured to the wall 13 and also a bearing 74 which is secured to a strip 75 located above the wall 69 and in the same plane therewith. The strip 75 is also provided with an upper board 76 which is similar in form to the board 53 of the wall 28. A sprocket wheel 77 is keyed to the shaft 72 and is connected by a chain 23 having fingers 26 to a sprocket wheel 78. The sprocket wheel 78 is supported on a shaft located in a bearing 79. The shaft is also provided with a sprocket wheel 80 which is connected to a sprocket wheel 81 by means of a chain 23 having the fingers 26. The chains 23 connected to the shaft 11 through the sprocket chains, the shaft 72 and the gear wheels 70 and 71 also move forward on the side of the wall 69 or strip 75 on which the shaft 72 is located, and rearwardly between the walls 69 and 28.

The wheel 81 (Fig. 7) is supported on a pivoted bar 82 which is secured in position by a bolt 83 for pivotal movements relative to the strip 75 and the wall 69. The upper edge of the bar 82 is rabbeted in a similar way that the bar 42 is rabbeted. The bar 82 is also provided with a sheet metal strip or cover 84 which extends over the upper edge of the rabbeted portion of the bar and thus forms a channel or groove in which the chain 23 is located. The bar 82 is moreover connected by a spring 85 to the cover board 76 to cause the return of the bar 82 when it is moved out of its normal position. The spring 85 is connected to the cover board 76 by means of a pin 86. The bar 84 is moved inward with respect to the two walls 28 and 69 by means of a wire 87 which moves over a pulley 88 which is secured to the cover board 76. The wire 87 passes beneath the board 76, thence upward through an opening in the cover board 76 to the top of the frame 31, whence it is connected to the wire 51 which is in turn connected to the lever 59 so that when the lever 59 is operated the wheels 81 and 41 are moved inward with respect to the two walls and the fingers 26 close around the corn stalks and so as to lift the corn stalks from the ground. By this arrangement the corn stalks are caught between the fingers 26 of the two chains which are supported on the bars 42 and 82, and which are moved toward each other in the same plane by movement of the lever 59. This prevents the corn from slipping away from the harvester and being further pushed down as the harvester moves over the corn. The corn is picked up until it is caught by the chains and lifted upward as the harvester moves along.

Between the wall 69 and the strip 75 (Fig. 2) is located a roller 89 which is supported in a bracket 90 which is secured to the wall 69 and to the bracket 91 which is secured to the U-member 16. It is also provided with a cog wheel 92 which is operated upon by a cog wheel 93. The cog wheel 93 is connected to a shaft 94 which is supported in bearings 95 secured to the wall 69 and the strip 75. The shaft 94 is connected by a universal joint 96 to a shaft 97 which is supported in bearings 98 secured to the wall 69. The shaft 97 is provided with a sprocket wheel 99 which is connected to a sprocket wheel 100 by a sprocket chain. The sprocket wheel 100 is located on a shaft 101 which is supported in a bearing 102 on the frame 1 and extends through an opening in the wall 13. A bevel gear wheel 103 (Fig. 1) is keyed to the shaft 101 and is operated upon by a bevel gear wheel 104 which is keyed to the shaft 7. The shaft 7 is driven by the sprocket wheel 5 and thus the roller 89 is rotated, it being connected through the shafts 94, 97, 101 and the sprocket wheels 99 and 100, and the bevel gear wheels 103 and 104 with the shaft 7. The roller 89 is provided with a thrust bearing 105 which is located intermediate the cog wheel 92 and the lower bracket 90. The barrel 89 is also provided with a spiral 106 which is formed of a round metal rod or wire bent in the form of a spiral and is secured to the barrel 89 by spot welding or by any other suitable means. When the barrel 89 is rotated the spiral operates to lift any corn that may be bent down and which is caught up by the fingers 26 of the chains 23 located on the bars 42 and 82. It also operates to draw the leaves of the corn upward along the stalks. Furthermore it operates to squeeze or drag off the ears of corn, it being located in close proximity to the wall 28. If any of the corn stalks are pulled up by the operation they are carried upward by the operation of the spiral 106. Also, the ears of corn, if removed from the husks by the lower end of the barrel 89, are carried up by the operation of the spiral to the upper part of the barrel 89, whence they may fall through the opening 107, whence they may be dropped into a husker or caught by a suitable trough or other means in order to remove them from the harvester.

If any of the corn is pulled from the ground by the operation of the harvester, particularly by the operation of the spiral 106 located on the barrel 89, the corn will be carried upward to the top of the barrel by the spiral 106, whereupon it will be engaged by bars 108 (Figs. 4 and 9) which are located on sprocket chains 109 that move over sprocket wheels 110. One set of sprocket wheels 110 is supported on a shaft 111 which is supported in bearings 112 that are secured to the wall 28. The chains and bars pass through an opening 113 which is formed in the wall 28. The other set of sprocket wheels 110 is keyed to the shaft 18, which is driven by the cog wheel 17 and the shaft 11. The bars 108 are provided with re-turned lips 114 which are formed by bending rearwardly one of the edges of the angle bar of which the bars 108 are formed. The bars 108 move forward on the outside of the wall 28 and rearward on the inside of the wall. The turned portions of the lips 114 pass in the vicinity of a pair of rollers 115. The rollers 115 are connected to shafts 116 (Fig. 8) and 117 which are supported in bearings 118, one of which is supported on the bracket 91 and the other on the U-member 16. The shafts 116 and 117 are connected together by cog wheels 119. A sprocket wheel 120 is connected to the shaft 116 and by a sprocket chain 121 which is connected to a sprocket wheel 122 located on the shaft 7, and thus the rollers 115 are rotated in opposite directions by the operation of the shaft 7, the sprocket chain 121 and the cog wheels 119. The rollers 115 are provided with means for pinching off, if necessary, the ears of corn. This is particularly useful where the ears cannot be readily pulled or pinched off by the operation of the barrel 89. When the ears of corn cling with sufficient tenacity to the stalks the roller 89 will pull the stalks from the hill and carry the stalks, together with the ears of corn connected thereto, upward until the stalks and corn are engaged by the bars 108. They will be engaged by the lower ends of the bars 108, particularly about the portions of the bars 108 at which the lips 114 are located. The lips 114 passing in the vicinity of the ends of the rollers 115 force the stalks and corn in front of the rollers 115. The rollers 115 are disposed a short distance from each other and have some play, so that the rollers tend to carry the stalks of corn rearwardly as well as the bars 108, and at the same time the rollers tend to pinch the ears off from the stalks. If, however, the friction of the stalks with the rollers is not sufficiently great to cause this pinching operation, the rollers are provided with means whereby the ends of the ears of corn will be actually pinched or broken. The means consists of a flange 123, while one roller 115 is provided with a channel 124. The rollers 115 are so connected with the cog wheels 119 that the flange 123 will enter or approach entrance to the channel 124, and thus the end of the ear of corn which is connected to the stalk will be pinched or cut off. The ear will fall forward onto the barrel 89, or will drop through the opening 107, to be removed with the other ears of corn which are taken from other stalks. The rollers 115 will prevent the ears of corn from being carried rearward.

The corn harvester may be provided with cutters. It may be provided with the cutter 125 which is supported in a bracket 126 and in a plate 127. It is connected to a shaft which is keyed to the sprocket wheel 128. The sprocket wheel 128 is driven by a sprocket wheel 22 which is located on the shaft 18. The cutter 125 operates to cut the stalks of corn, preferably about the beginning of the first leaves of the stalk. Other cutters 129 may be provided which are secured to the shaft 11 and in their rotation cut the stalks at different points as the harvesters pass the stalks. The harvester may also be provided with a cutter 130 which is supported on an L-member 131, which is secured to the tongue 4 and to the frame 1.

The blade 130 is located in a diagonal position with respect to the direction of movement of the harvester and lies close to the ground. Consequently, when the harvester is drawn along the hills of corn, the stalks are cut close to leave a short stump. On the left side of the harvester a fender 133 is provided. It consists of a pair of arms which are secured to the frame 1 and to the bearing of the wheel 2, and protects the outer wheel 2 from contact with the corn. At any rate, it pushes the corn to one side to leave free movement of the harvester and to prevent the corn from being pushed down by the wheel 2 or its hub.

The front part of the harvester is provided with a wheel 134 which is adjustably bolted to the bracket 135 which is secured to the board 75 located within the plane of the wall 69 and to an extension of the frame 1.

I claim:

1. In a corn harvester, the combination of a plurality of engaging members, means for moving the engaging members rearwardly as the corn harvester is moved forward, bars, means for moving the bars rearwardly relative to the harvester, a pair of rollers, located at right angles to the bars, the bars operating to push the corn stalks into the rollers, the rollers operating to force the ears of corn from the stalks, and means for rotating the rollers in opposite directions.

2. In a corn harvester, the combination of a plurality of engaging members, means for moving the engaging members rearwardly as the corn harvester is moved forward, bars, means for moving the vertical bars rearwardly relative to the harvester, the bars having forwardly extending lips for engaging the corn stalks, a pair of rollers located in proximity to each other and the lips of the bars, the bars operating to force the corn into the rollers, and means for rotating the rollers in opposite directions.

3. In a corn harvester, the combination of a plurality of bars, means for moving the bars rearwardly relative to the harvester, a pair of rollers located at right angles to the bars, the bars having forwardly extended lips which pass beside the ends of the rollers, the bars operating to force the corn between the rollers, and means for causing the rollers to rotate in opposite directions.

4. In a corn harvester, the combination of a plurality of engaging members, means for moving the engaging members rearwardly relative to the harvester, an inclined barrel having means for removing the ears of corn from the stalks, vertical bars located in the vicinity of the upper end of the barrel, means for moving the vertical bars rearwardly relative to the harvester, a pair of rollers located at right angles to the bars, and means for causing the rollers to rotate in opposite directions, the bars operating to force the stalks and ears of corn in front of the rollers for engagement by the rollers.

5. In a corn harvester, the combination of a plurality of vertically disposed bars, means for moving the bars rearwardly relative to the harvester, a pair of rollers located at right angles to the bars, the rollers having means for pinching the ears from the stalks of corn, and means for causing the rollers to rotate in opposite directions.

6. In a corn harvester, the combination of a plurality of vertically disposed bars, means for moving the bars rearwardly relative to the harvester, a pair of rollers located at right angles to the bars, one roller having a flange and the other roller having a channel, and means for causing the rollers to rotate in opposite directions and causing the flange and channel to intermittently register in the rotation of the rollers.

7. In a corn harvester, the combination of a plurality of vertically disposed bars, means for moving the bars rearwardly relative to the harvester, a pair of rollers located in the vicinity of the bars, the rollers having means for pinching the ears from the stalks of corn, the ends of the rollers located in the vicinity of the vertical bars, the axes of the rollers located substantially at right angles to the bars, and means for causing the rollers to rotate in opposite directions.

8. In a corn harvester, the combination of a plurality of vertically disposed bars, means for moving the bars rearwardly relative to the harvester, a pair of rollers, the axes of the rollers located at right angles to the bars, one roller having a flange and the other roller having a channel, and means for causing the rollers to rotate in opposite directions and causing the flange and channel to intermittently register in the rotation of the rollers.

9. In a corn harvester, the combination of a plurality of engaging members, means for moving the engaging members rearwardly as the corn harvester is moved forward, an inclined rotatable barrel having a helicoidal metal strip on the surface of the barrel, vertical bars located in proximity to the upper end of the barrel, means for moving the bars in the same direction that the engaging members are moved, the vertical bars having forwardly extending lips, rollers, the axes of the rollers located at right angles to the bars, the ends of the rollers located in proximity to the lips, one roller having a flange, the other roller having a channel, and means for causing the rollers to rotate in opposite directions and the flange and channel to register intermittently.

10. In a corn harvester, the combination of two sets of engaging members, means for moving the engaging members rearwardly relative to the harvester, an inclined barrel having a helicoidal strip, means for causing the rotation of the roller, means for moving the engaging members of the two sets toward each other, a plurality of vertical bars located at the upper end of the inclined barrel, and means for causing the rollers to rotate in opposite directions, the vertical bars operating to push the corn to engaging position between the rollers.

In testimony whereof, I have hereunto signed my name to this specification.

HERMAN J. HAHN.